United States Patent [19]
Miller et al.

[11] 3,840,979
[45] Oct. 15, 1974

[54] METHOD FOR ANGULAR ALIGNMENT OF INERTIA OR FRICTION WELDED PARTS

[75] Inventors: Robert G. Miller, Metamora; John W. Crayton, Washington; Charles G. Farmer, Edelstein; Ronald L. Satzler, Metamora, all of Ill.

[73] Assignee: Production Technology Inc., Peoria, Ill.

[22] Filed: May 3, 1973

[21] Appl. No.: 356,731

Related U.S. Application Data

[62] Division of Ser. No. 198,256, Nov. 12, 1971, Pat. No. 3,750,927.

[52] U.S. Cl. .................... 29/470.3, 156/73, 228/2
[51] Int. Cl. .......................................... B23k 27/00
[58] Field of Search .......... 29/470.3; 228/2; 156/73, 156/580

[56]  References Cited
UNITED STATES PATENTS

| | | |
|---|---|---|
| 3,541,669 | 11/1970 | Yocum ............................. 228/2 X |
| 3,563,444 | 2/1971 | Loyd ................................ 156/73 X |
| 3,564,703 | 2/1971 | Kiwalle ............................ 29/470.3 |
| 3,691,622 | 9/1972 | Takagi et al. ...................... 228/2 X |

Primary Examiner—J. Spencer Overholser
Assistant Examiner—Robert J. Craig
Attorney, Agent, or Firm—Phillips, Moore, Weissenberger, Lempio & Strabala

[57]  ABSTRACT

Friction welded parts are rotatively aligned by turning one part with respect to the other through the hot plastic interface after the parts have been welded. A position error circuit measures the relative angular position of the parts at the end of the weld and activates a rotary actuator to turn one part with respect to the other until the desired angular alignment is obtained.

4 Claims, 5 Drawing Figures

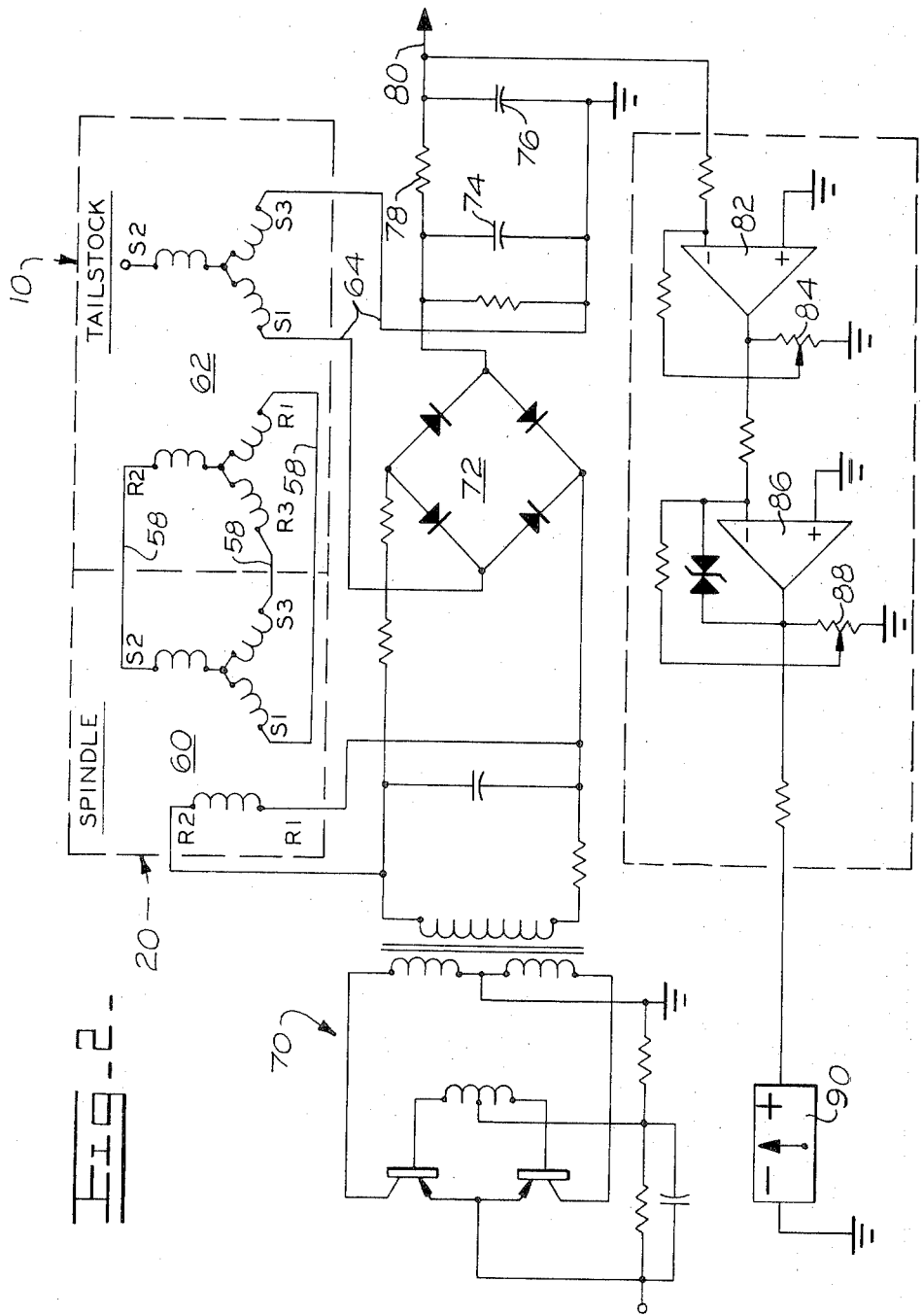

Fig.-3-

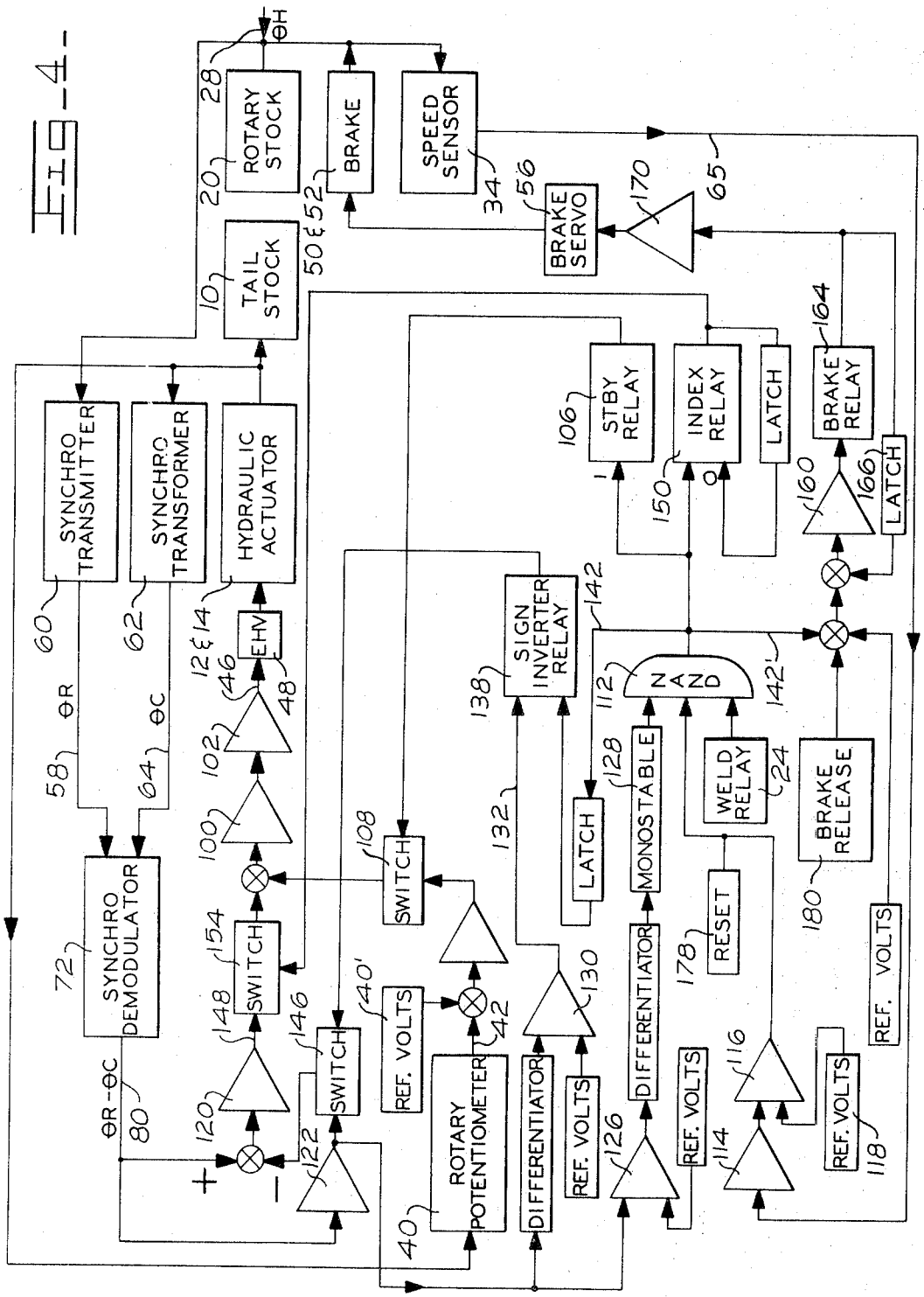

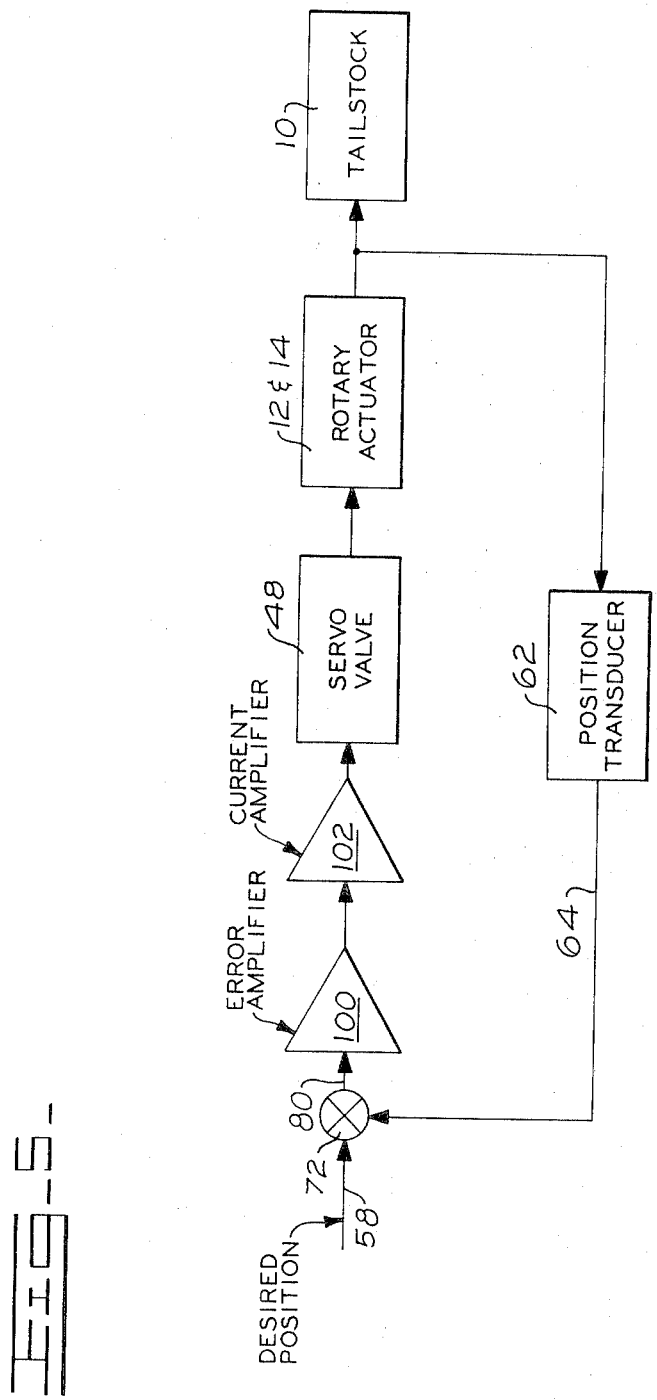

METHOD FOR ANGULAR ALIGNMENT OF INERTIA OR FRICTION WELDED PARTS

This is a division of Ser. No. 198,256, filed Nov. 12, 1971, now U.S. Pat. No. 3,750,927.

BACKGROUND OF THE INVENTION

1. Field of the Invention

This invention relates to a friction welding process and to a friction welding machine of the kind in which two parts are engaged in rotating contact under an axial load at a common interface to heat the interface to a hot plastic condition.

2. Description of the Prior Art

Two kinds of welding machines have been used for making such welds in the prior art.

A conventional friction welding machine produces relative rotation of the parts by direct drive from a motor.

In the inertia friction welding process the relative rotation of the parts is obtained from the energy stored in flywheels or other inertial masses.

In the inertia process the rotating spindle is allowed to run down without braking or declutching from the flywheels, and the relative rotational position of the parts is whatever results at the end of the weld cycle.

In the conventional friction welding process a brake is often used to stop rotation of the spindle, but the brake does not permit rotational alignment of the parts at the end of the weld cycle.

In many applications, rotational alignment of the parts being welded is not essential. For example, in the welding of valves, hose couplings, tubes to plates and parts having symmetrical geometry (such as rods and tubes) angular alignment is not essential.

In other instances, however, angular alignment is necessary. For example, angular alignment or indexing capability is necessary for the welding of splines, keyways, shafts and many other non-symmetrical shapes.

SUMMARY OF THE INVENTION

The present invention permits the angular alignment of welds to within plus or minus 1° of arc.

The present invention comprises a tailstock indexing control which replaces the stationary chuck on a friction welding machine. During the last revolution of the weld cycle the tailstock indexing control rotates the tailstock until it is in alignment with the headstock.

The tailstock indexing control has two modes of operation, standby and index.

In standby, the tailstock position is held fixed, similar to a stationary chuck. In the index mode, the tailstock position is changed until angular alignment is achieved.

The tailstock indexing control has two parts, the analog control and the digital control.

The analog positions the tailstock.

The digital control switches the unit from standby mode to index mode.

The tailstock indexing control is basically a closed loop electrohydraulic position servo system.

In the position servo, the actual position of the tailstock is measured by a transducer and is coverted into an electrical signal. The measured actual position is compared to a reference position. The difference between the two is the position error. This error signal is amplified by a voltage amplifier and is converted into a current.

The error current is supplied to a four way electro hydraulic servo valve where it is converted into oil flow. The oil flow produces rotary hydraulic actuator velocity and hence changes the position of the tailstock. The tailstock position changes until the actual position equals the reference position and the error is zero.

At that point the flow and the tailstock velocity are zero, and alignment is achieved.

When the control is in the standby mode the reference position is a fixed voltage from potentiometer.

But during the index mode the reference position is the headstock position.

Therefore, when the control switches from standby to index, the reference position in the analog control switches from a fixed value to the headstock position.

The digital portion of the tailstock indexing control monitors specific system parameters and switches the analog control from standby to index when appropriate conditions are satisfied. These conditions are (1) the welder must be in the process of producing a weld, (2) the headstock velocity must be less than a reference value and (3) the position of the headstock relative to the tailstock must be within a specific band.

The digital control logically accomplishes its task in the following manner.

Indexing occurs when three signals simultaneously appear at an "and" gate. Signal 1 comes from a weld relay when the welder is producing the weld. Signal 2 comes from a comparator when the headstock velocity falls below a reference value. Signal 3 exists for a fraction of a second from a monostable multivibrator when a synchro position error falls below a reference value. The short time of existence for Signal 3 confines the band of acceptable position error. Once indexing is initiated, it is internally latched through the logic.

The standby mode is obtained by depressing a reset switch. The reset switch inhibits the index logic loop and thus produces the standby mode.

The tailstock indexing control utilizes a brake on the headstock of the welding machine. The brake is applied during indexing to rapidly decelerate the headstock and to hold it still until alignment of the tailstock is completed.

The brake holds the headstock still while the tailstock is being aligned. The tailstock will attempt to rotate the headstock through the weld interface unless the brake provides the necessary reaction torque.

Position transducers are used to measure the difference in angular position between the headstock and the tailstock. In a particular embodiment of the invention the transducers selected are two synchros.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 2 is a schematic view of the position error circuit used in the machine shown in FIG. 1;

FIG. 3 is a schematic view of the tailstock indexing control used in the machine shown in FIG. 1;

FIG. 4 is a block diagram of the tailstock indexing control used in the machine shown in FIG. 1; and FIG. 5 is a block diagram of the closed loop electrohydraulic position servo system of the analog control.

DESCRIPTION OF THE PREFERRED EMBODIMENT

Figure 1:
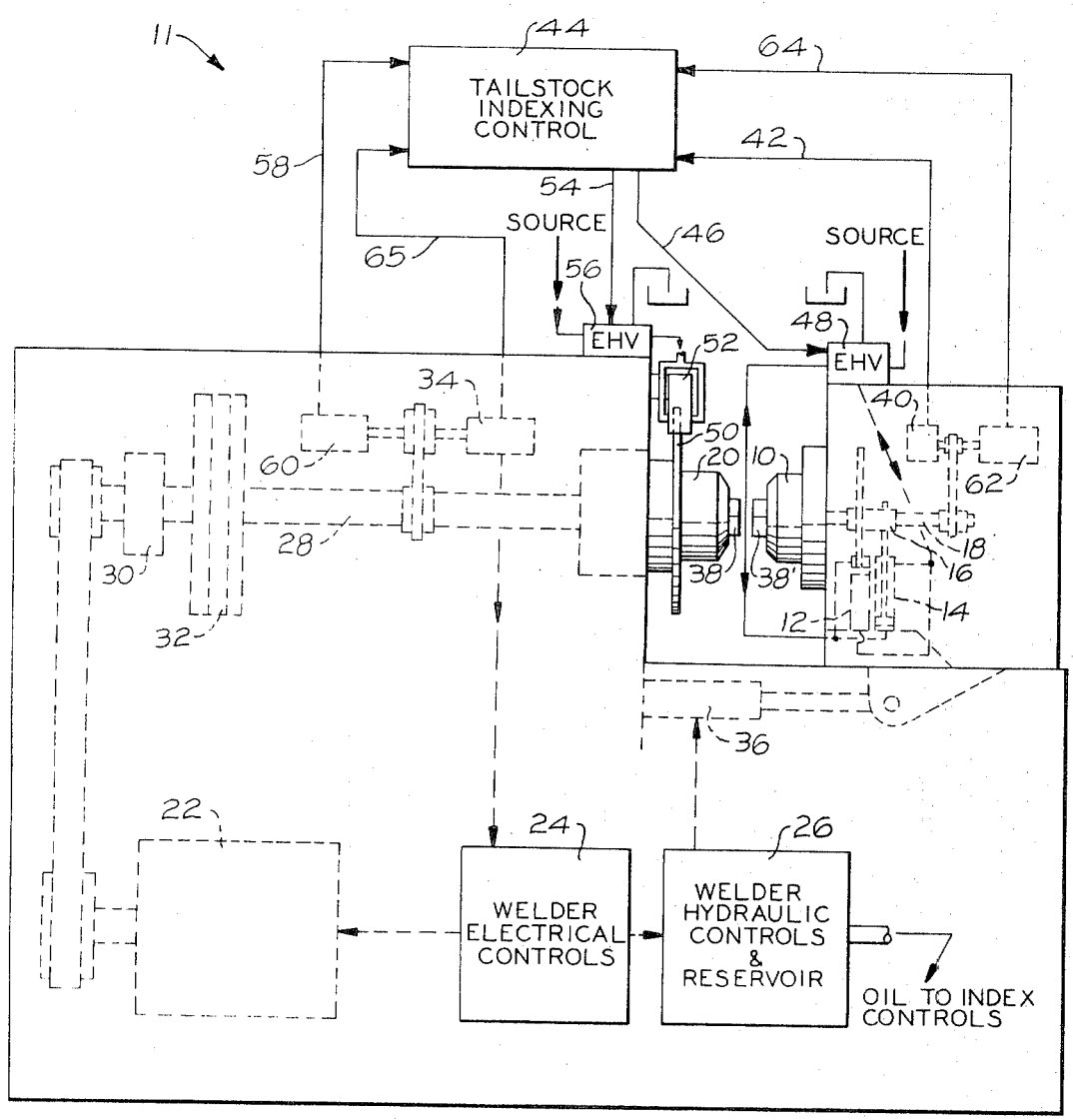
FIG. 1 is a side elevation view of a friction welding machine constructed in accordance with one embodiment of the present invention.

A friction welding machine constructed in accordance with one embodiment of the present invention is indicated generally by the reference numeral 11 in FIG. 1.

The welding machine 11 shown in FIG. 1 is an inertia welding machine.

The machine 11 includes a tailstock indexing control indicated generally by the reference numeral 44 in FIG. 1.

While the drawings illustrate and the following description describes the tailstock indexing control 44 in association with an inertia welder, the tailstock indexing control 44 may equally well be used with a conventional friction welder.

The welder 11 has a spindle or rotatable chuck 20, a drive motor 22, electrical controls 24, a hydraulic source and a control 26, a spindle-drive shaft 28, a clutch 30, inertia weights 32, a speed sensor 34 driven by the spindle shaft, and a hydraulic ram 36 to bring the workpieces 38 and 38' into frictional engagement. All these parts are conventional in inertia welder arrangements.

In a standard inertia welder, the chuck 10 would be stationery at all times.

With the workpieces 38 in the chucks, the weld cycle is started by actuation of an appropriate switch in the electrical control 24 to power the drive motor 22. The drive motor 22 then accelerates the fly wheel mass 32 through a oneway overrunning clutch 30. As the flywheel and spindle are rotating a speed signal is returned to the control 24 from the sensor 34. When a predetermined speed is attained, the control 24 removes power from the motor 22 and sends a signal to the hydraulic control 26 to actuate the ram 36 and to move the workpiece 38' into 2 frictional engagement with the workpiece 38.

At this time drive is removed from the shaft 28 through action of the clutch 30, but the inertia in the weights 32 continues to rotate the spindle until the stored energy is dissipated. The spindle then comes to rest, and the weld is complete. Speed sensitive circuitry may be incorporated in the control 24 to cause the hydraulic control 26 to actuate the ram 36 such as to vary the weld pressure at desired points in the weld cycle.

FIG. 1 shows the components of the tailstock indexing control 44 of the present invention associated with the inertia welder 11.

The stationary chuck is replaced by a chuck 10 that is capable of being rotated through an arc of approximately 355° by a commercial Flo-Tork rotary actuator, here represented by cylinders 12 and 14. Portions of the rods of these cylinders are in the form of racks, and the two racks engage a spline 16 on a shaft 18 rigidly attached to the chuck 10.

The Flo-Tork rotary actuator is available as an off the shelf item from the Flo-Tork Incorporated, Orrville, Ohio.

As will be apparent from the description to follow, other actuator means may be used to produce the required relative rotation and desired angular alignment between the workpieces at the end of the weld cycle.

Since in the present instance the tailstock 10 is rotatable, it must be held stationary until the welder 11 shifts to the indexing mode to insure proper later alignment and also to permit proper heating of the weld interface. To accomplish this, a rotary potentiometer 40 is driven from a tailstock shaft 18 through a spline and timing belt arrangement to send a signal representing actual tailstock position over a line 42 to the indexing control 44 where it is matched with a desired position signal from a potentiometer (not shown) in the control.

During the major portion of the weld cycle (until the control shift to the index mode) any mismatch in the potentiometer signals caused by slight motion being imparted to the tailstock by frictional engagement of the weld parts overcoming the hydraulic lock provided by the rotary actuator (12 and 14) results in a correction signal on line 46.

The correction signal is supplied to an electrohydraulic valve 48 which directs oil to the rotary actuator in a proper manner to drive the tailstock back to where the actual and desired positions are again matched.

Thus, during this standby mode period, the tailstock is in effect a stationary device.

When the system indexes, the tailstock actuators are capable of turning the tailstock slightly less than 360°, hence alignment must be accomplished in the final revolution of the weld cycle. In addition, alignment cannot be accomplished until the spindle comes to rest. In view of these facts, added to the reality that indexing of the tailstock could turn the spindle through the weld interface, a disc brake arrangement is associated with the spindle.

The brake disc 50 is integral with spindle 20 and its actuator is contained within the housing 52 which is grounded to the machine frame.

When the controls 44 shift to the indexing mode, a signal appears on line 54 to cause an electrohydraulic valve 56 to supply actuating pressure to the disc brake arrangement and to hold the spindle. Once the spindle is stopped, rapid and accurate alignment is achieved through operation of the tailstock indexing mechanism (12, 14 and 16).

When the weld cycle is started the analog portion of control 44 is supplied a signal which is the result of matching the signal representing actual tailstock position from potentiometer 40 with a signal from a potentiometer in control 44 representing desired tailstock or reference position. The result is that tailstock 10 is maintained in a fixed position through control of the rotary actuator (12 and 14) by the analog control.

At the same time, the headstock position signal is being fed to the digital portion of control 44 over a lead 58 from a synchro transmitter 60. A tailstock position signal is supplied to the digital control portion by a synchro differential 62 over a lead 64.

These signals are combined in the control to provide an error signal.

A spindle speed signal is supplied to the control 44 over a lead 65 from the speed sensor 34 at all times. Logic circuits in the digital portion of control 44 sense when splindle speed is proper and the error signal is within an acceptable band.

The control shifts from a standby to an index mode when proper conditions are met.

During the standby mode of operation, the reference position to the analog portion of the control 44 is a fixed voltage from a potentiometer within the control.

When the control switches to the index mode, the position reference signal and tailstock position signal from the potentiometer 40 are switched out of the circuit; and the referenced position signal to the analog control is the spindle position as sensed by the synchro 60.

Switching also changes the source of the tailstock position signal from the potentiometer 40 to a synchro 62.

Thus, the error signal then seen by the analog portion of the control becomes the difference between spindle position and tailstock position as seen by the synchro sensors.

The analog control is then basically a closed loop electrohydraulic position servo system as illustrated in FIG. 5.

When indexing is initiated, a latched headstock braking signal appears on a line 54, and a latched position error signal appears on a line 46. This brakes and holds the headstock 20 and causes the tailstock to index until the error signal on the line 46 is O and alignment is achieved.

Once alignment is achieved, the latches on the index circuit and the brake circuit cause the spindle and tailstock to remain aligned until appropriate releases are actuated in the control 44. This feature is beneficial in assuring a proper starting point for the next weld cycle.

FIG. 2 shows the position error circuit for the index mode which includes the synchro transmitter 60 (driven by the spindle) and the synchro differential 62 (driven by the tailstock).

An oscillator section 70 provides excitation to the synchro circuit and a reference for a demodulating bridge 72. The oscillator frequency is not critical and can be between 4 and 10 KHZ.

Releative rotation of the synchros 60 and 62 (actually 62 is stationary during the standby mode) causes an amplitude modulated signal to be produced in the stator windings of the tailstock synchro 62. This signal is taken from the S1 and S3 windings, and is an amplitude modulated envelope of the excitation frequency. The envelope represents instantaneous angular difference (error) between the two synchros.

The signal on the lines 64 is applied to the bridge 72. The bridge output is filtered by an RC filter consisting of capacitors 74 and 76 and a resistor 78.

The output on the lead 80 is thus a changing DC signal representing the instaneous error in alignment between the synchros 60 and 62.

The error signal is averaged in an amplifier meter arrangement consisting of an amplifier 82 with an error gain adjustment 84, an amplifier 86 with a meter gain adjustment 88, and a meter 90.

When the signal on the line 80 is changing rapidly, the meter cannot follow, but when the error signal is changing slowly, or is constant, the error or deviation from alignment can be read on the meter.

When the weld parts are aligned, the meter reads 0.

Any relative displacement between the spindle and tailstock position will be indicated on the meter. Thus alignment of the headstock and the tailstock can be accomplished when placing parts in the chucks through observation of the meter.

The basic requirement of the indexing system is that the parts to be welded are oriented in the angular relationship desired in the finish weld prior to start of the weld cycle.

Figure 3:
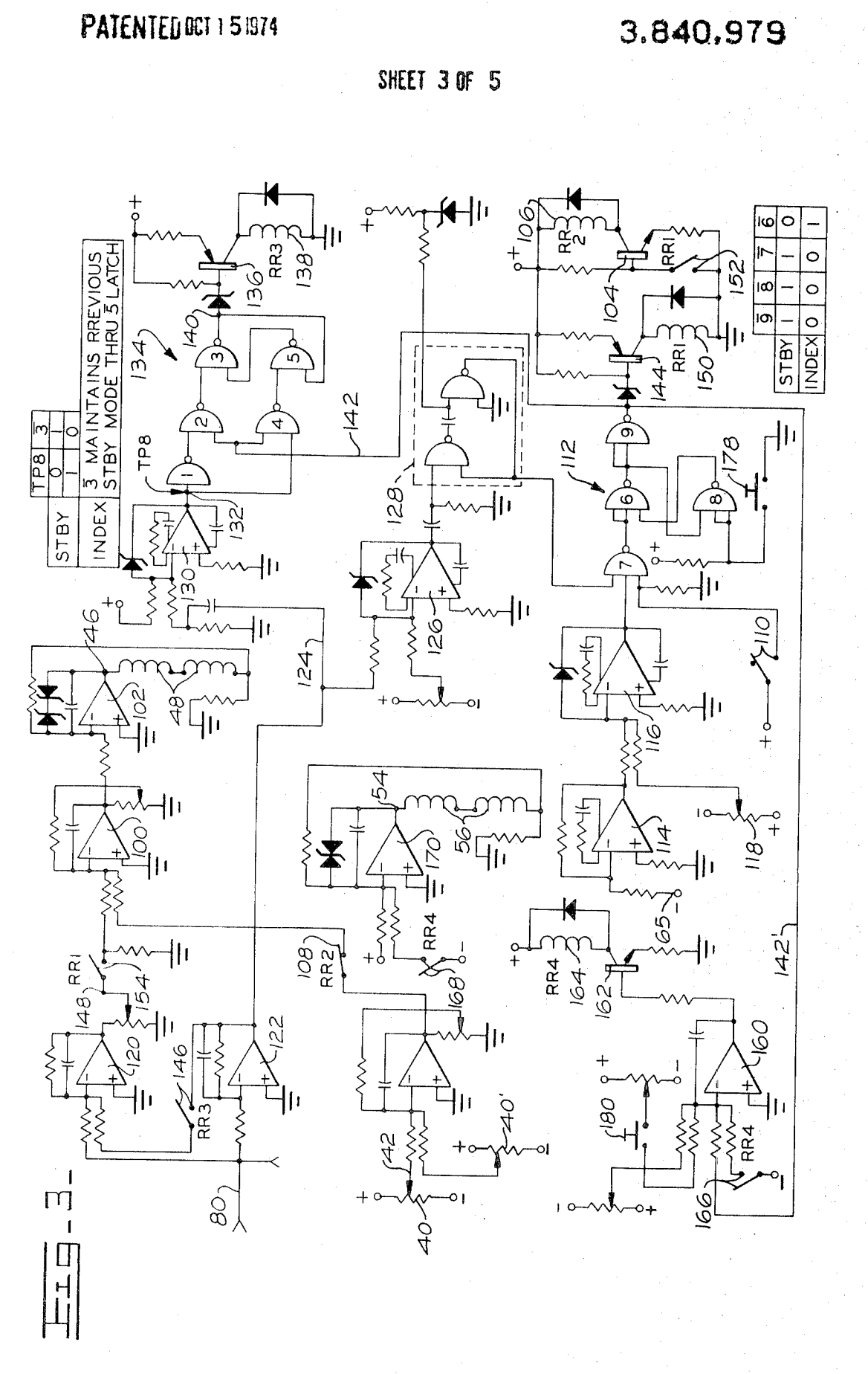

FIG. 3 shows the tailstock indexing control circuitry.

In this circuit, an analog control controls an electrohydraulic valve 48 (here shown as the solenoid coil) which causes movement of the tailstock actuator (12 and 14 of FIG. 1).

The control for the coil 48 is effected by a voltage amplifier 100 and a current amplifier 102. The purpose of the current amplifier 102 is to eliminate the electrical time constant of the hydraulic servo valve including the solenoid coil 48.

In the standby mode an NPN transistor 104 is normally conductive causing a relay coil 106 to be energized. This closes the contacts 108 so that the error signal for driving the analog circuit is taken from the amplified difference between the potentiometer 40 associated with the tailstock and a reference potentiometer 40' in a control box 44 (FIG. 1).

In this state, the analog control responds to any changes in the wiper position of the potentiometer 40 due to frictional engagement of the weld parts to energize the coil 48 and to effect control of the tailstock actuator to keep the tailstock stationary.

As the weld cycle is started by energizing a weld relay in the electrical control 24 (FIG. 1), an auxiliary contact 110 of the relay is closed to place a positive voltage at one input to a speed logic circuit 112 which tells the control that a weld is being produced.

This is one of three requirements that must be met before the control will shift to an index mode, as will be seen later.

As the welder drive accelerates, a speed signal is taken from sensor 34 (FIG. 1) and applied over the lead 65 to a speed comparator circuit consisting of the amplifiers 114 and 116.

A speed reference potentiometer 118 establishes the speed at which it is desired that indexing take place.

When a proper relationship exists between the actual speed signal at 65 and the desired speed reference at 118, amplifier 116 will have an output which is applied to NAND gate 7 as its second input.

This is the second requirement for initiation of the index mode.

The error signal produced by the position error circuit of FIG. 2 is applied to the digital circuitry over the line 80. From this point it is fed to two amplifiers 120 and 122. The amplifier 122 has twice the gain of the amplifier 120. Its output is fed over the line 124 and used as input to a synchro signal comparator 126.

The output of the comparator 126 is differentiated and applied to a logic monostable multivibrator 128, the action of which is to put out a 50 milisecond pulse each time the synchro error signal at the line 80 goes through 0 in the positive going direction.

This pulse is the required third input to the NAND gate 7 to cause shifting to the index mode.

The amplified error signal on line 124 is also fed to a second comparator 130 where it is differentiated at the input to the comparator 130 such that the output at the point 132 is the derivative of the original error signal (leads by 90°).

The derivative signal is fed to a logic circuit 134 comprised of a group of NAND gates.

The logic circuit 134 controls a sign changer circuit consisting of a transistor 136 and a reed relay 138.

When the welder is operating in the standby mode, the logic circuit functions such that when there is a signal at the point 132, there is no signal at the point 140, and a PNP transistor 136 conducts to energize the reed relay 138.

Thus, as the error signal is changing, the relay 138 pulses until the logic circuit is latched by the signal to index on the line 142.

The logic circuits 112 and 134 are both comprised of NAND gates with internal latching. It is characteristic of these devices that when a 1 appears at all inputs, a 0 is produced at the output. A 0 on any one input results in a 1 at the output.

The logic circuit 112 is triggered to index when the three inputs are present at the NAND gate 7. This causes a 0 input to the gate 6, a 1 input to the gate 9, and a 0 to the base of the transistor 144, which says the system is ready to index.

At the same time, a 1 out from the gate 6 causes the gate 8 to have a 0 output, which latches the logic by causing the gate 6 to maintain a 1 output regardless of what occurs at the input to the gate 7.

The pulsing of the logic circuit 134 causes intermittent operation of the relay contacts 146. This causes the highly amplified and inverted error signal from 122 to be summed with the error signal input to the amplifier 120.

When conditions are proper, and the index signal (0 voltage) is seen at the base of the transistor 144, the same signal appears on the line 142 and causes the logic circuit 134 to latch at whatever state it happened to be at that instant. This says that conditions are right for indexing and that no changes can be made.

The interaction of the amplifiers 120 and 122 and the reed relay 138 causes an error signal at the point 148 that always causes tailstock indexing through energizing the coil 48 to be in proper direction to drive the error signal at the point 148 toward 0 as alignment is being achieved.

As indexing is initiated, the transistor 144 conducts to energize reed relay 150.

This closes the contacts 152, shutting off the transistor 104.

The contacts 108 open as the contacts 154 close to shift the input to the analog circuit from the potentiometer reference to the headstock synchro reference.

The logic circuit 112 is latched when a 0 signal appears at the output of the NAND gate 9.

This causes the transistor 144 and the reed relay 150 to also latch in the index mode and further latches the logic circuit 134 because of the 0 voltage on the line 142.

Simultaneously with the above-noted shift to the index mode, the indexing signal is also fed over a lead 142' to the input of a brake reference circuit consisting of amplifier 160, transistor 162, and a reed relay 164.

The output from the amplifier 160 fires the transistor 162 to energize the reed relay 164.

When the relay operates it latches through its own contacts 166 and also closes contacts 168 to cause a current amplifier 170 to energize the coil 56 which is the actuating coil for electrohydraulic valve 56 (FIG. 1).

This sets the brake on the splindle to rapidly bring it to a stop.

Once the spindle stops, the synchro reference signal from the synchro 60 becomes fixed; and the error signal to the analog positioning loop (the amplifiers 100 and 102) energizes the coil 48 of the electrohydraulic valve controlling the rotary actuator to cause the tailstock to be driven rapidly into alignment with the spindle.

At this time alignment is achieved and the input at amplifier 100 sees 0 error.

When alignment is achieved, the spindle brake remains actuated because of the clamp provided by closing of the contacts 166.

The indexing control is also clamped because of the latch on the logic circuits 112 and 134.

Any motion of the tailstock is quickly sensed by the synchro circuits (FIG. 2), and an input error signal is seen on the lead 80 to cause the rotary actuator to maintain the tailstock aligned with the braked spindle or headstock.

The finished weld part can be removed from the chucks and new weld parts inserted in the chucks in proper angular relationship and the welder is ready to start a new cycle.

To release the two chucks, a reset switch 178 must be depressed to unlatch the logic circuitry and to put the controls back into the standby mode, and a brake release switch 180 must be actuated to cause the amplifier 160 to cut off and to allow reed relay 164 to restore.

FIG. 4 shows the tailstock indexing control in block diagram form.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of rotatively aligning friction welded parts comprising,
   placing the parts in a friction welding machine in the desired angular alignment prior to engaging the parts in rotating contact at a common interface,
   pressing the parts together at the common interface and relatively rotating the parts to heat the interface to a plastic weldable condition,
   continuing relative rotation until the entire interface has been heated to the plastic weldable condition and then, as relative rotation between the parts is stopped and while the interface is still plastic, holding one part against rotation and turning the other part by auxiliary drive means to said desired angular alignment with respect to the one part.

2. A method as defined in claim 1 wherein said other part is turned through less than one revolution by said auxiliary drive means to said desired angular alignment.

3. A method as defined in claim 1 wherein relative rotation is discontinued prior to the start of the turning of said other part by said auxiliary drive means toward said desired angular alignment.

4. A method of rotatively aligning friction welded parts comprising, placing the parts in a friction welding machine in the desired angular alignment prior to engaging the parts in rotating contact at a common interface, pressing the parts together at the common interface and rotating one part relative to another part to heat the interface to a plastic weldable condition, continuing relative rotation until the entire interface has been heated to the plastic weldable condition, and then while the interface is still plastic, holding said one part against rotation and turning said other part to said desired angular alignment with respect to the one part, the friction welding machine having a rotatable spindle and a tailstock normally locked against rotation and wherein the rotatable spindle is stopped and clamped and the tailstock is turned to said desired angular alignment to thereby align said one part to said other part.

* * * * *